United States Patent [19]
Collard

[11] Patent Number: 5,698,820
[45] Date of Patent: Dec. 16, 1997

[54] METHOD AND APPARATUS FOR JUNCTION BOX AND CONDUIT SUPPORT

[75] Inventor: Bobby Collard, Garland, Tex.

[73] Assignee: Parsec Products, Inc., Garland, Tex.

[21] Appl. No.: 495,043

[22] Filed: Jun. 27, 1995

[51] Int. Cl.⁶ ..................................... H02G 3/18
[52] U.S. Cl. ..................... 174/57; 174/65 R; 220/3.7
[58] Field of Search .......................... 174/17 R, 48, 174/50, 58, 63, 65 R, 57; 220/3.3, 3.7, 4.02; 248/906

[56] References Cited

U.S. PATENT DOCUMENTS

| | | | |
|---|---|---|---|
| 3,440,331 | 4/1969 | Cohen | 174/61 |
| 3,503,580 | 3/1970 | Levy | 248/62 |
| 3,597,889 | 8/1971 | Lo Nigro | 52/28 |
| 4,572,391 | 2/1986 | Medlin | 220/3.9 |
| 5,354,952 | 10/1994 | Hickey | 174/48 |

*Primary Examiner*—Kristine L. Kincaid
*Assistant Examiner*—Dhiru R. Patel
*Attorney, Agent, or Firm*—John F. Bryan, Jr.

[57] ABSTRACT

A flat plate is provided to which an electrical junction box is centrally mounted with the plate extending beyond the sides of the junction box and conduits entering the junction box are supported by conduit clamps attached to the extended portions of the plate. Slots are provided in the extended portions of the flat plate to permit alignnment of the conduit clamps with the entering conduit.

17 Claims, 5 Drawing Sheets

METHOD AND APPARATUS FOR JUNCTION BOX AND CONDUIT SUPPORT

FIELD OF THE INVENTION

The present invention relates to junction box and conduit installation for electrical wiring and particularly to the provision of support for conduit entering a junction box for electrical installation in a building structure.

BACKGROUND AND SUMMARY OF THE INVENTION

The installation of electrical wiring in building construction is subject to stringently enforced codes in order to assure safe, trouble free operation. Wiring must be run in protective conduit with all of the connections made in junction boxes that provide both protection and access. Both the conduit and the boxes must be mounted to structural supports and constrained in accordance with the Electrical Code. In the typical commercial building, air ducts and wiring are installed overhead and subsequently concealed by a suspended ceiling. The junction boxes and conduit are placed at an elevation which allows room for ceiling segments to be lifted up and removed from their hanging framework to provide access for future maintenance. The electrical installation is supported in much the same manner as the suspended ceiling, by hangers anchored in the steel or concrete of the floor above. The National Electrical Code requires conduit to be supported within 36" of each entry to a junction box (18" for flexible conduit).

Others have disclosed wiring support arrangements which attach to the suspended ceiling frame. Such support however, requires that the electrical installation be made after the ceiling framework is in place, which is awkward and time consuming. The accepted method of support in the industry is to mount the junction box in place with one hanger and set a separate hanger within 36" for each conduit entering the box. An alternative method to setting separate hangers for each conduit is to bolt outwardly extending brackets on the box, above the entry holes, for clamp attachments. The brackets are made from cut lengths of formed "C" section structural members, with the open side facing down to receive clip washers for making a bolted connection to the back of the box. The conduit is supported by a clamp which is attached to the conduit and bolted to the underside of each bracket with another clip washer and bolt. The latter method eliminates a number of anchors and hangers and, inasmuch as the installer can pre-assemble the brackets to the box at floor level in a relatively short time, the overall cost of installation is reduced. Even so, there is a significant amount of time involved in assembly of the component parts, as well as the cost of the material.

The object of the present invention is to provide a simplified method and apparatus for supporting junction boxes and entering conduit so as to reduce labor and material costs for installation. A second object is to provide such method and apparatus for installation independent of suspended ceiling structure and in accordance with the specifications of the National Electrical Code.

The present invention accomplishes the above objects with a mounting bracket to which the back of any standard junction box can be bolted so as to provide conduit clamp attachments for all entry configurations without any need for field modification.

DESCRIPTION OF THE DRAWINGS

The aforementioned and other objects and features of the invention will be apparent from the following detailed description of specific embodiments thereof, when read in conjunction with the accompanying drawings, in which.

DETAILED DESCRIPTION OF THE INVENTION

Figure 1:
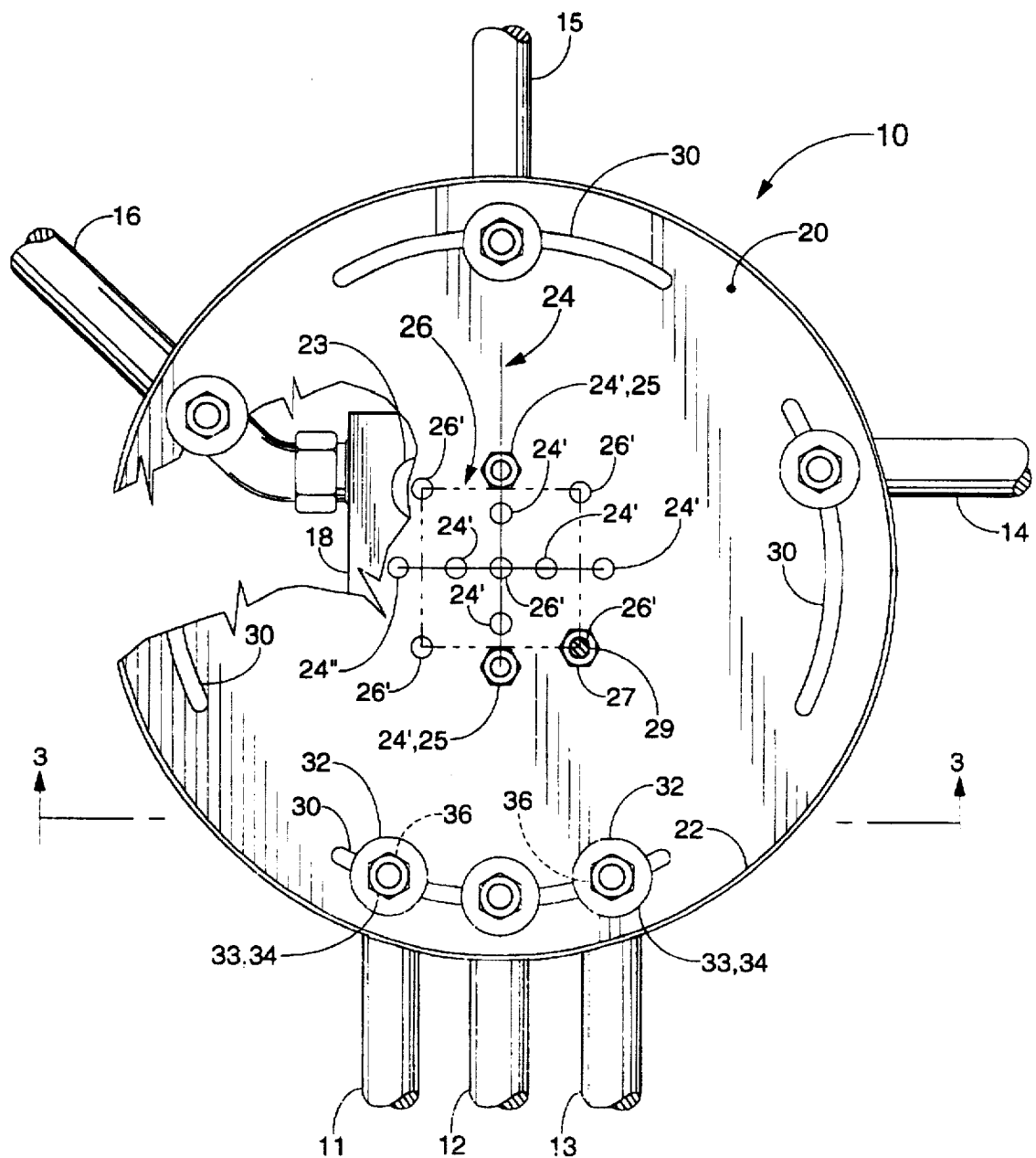
FIG. 1 shows a view from above of a preferred embodiment of the present invention as used in an electrical installation.
Figure 2:
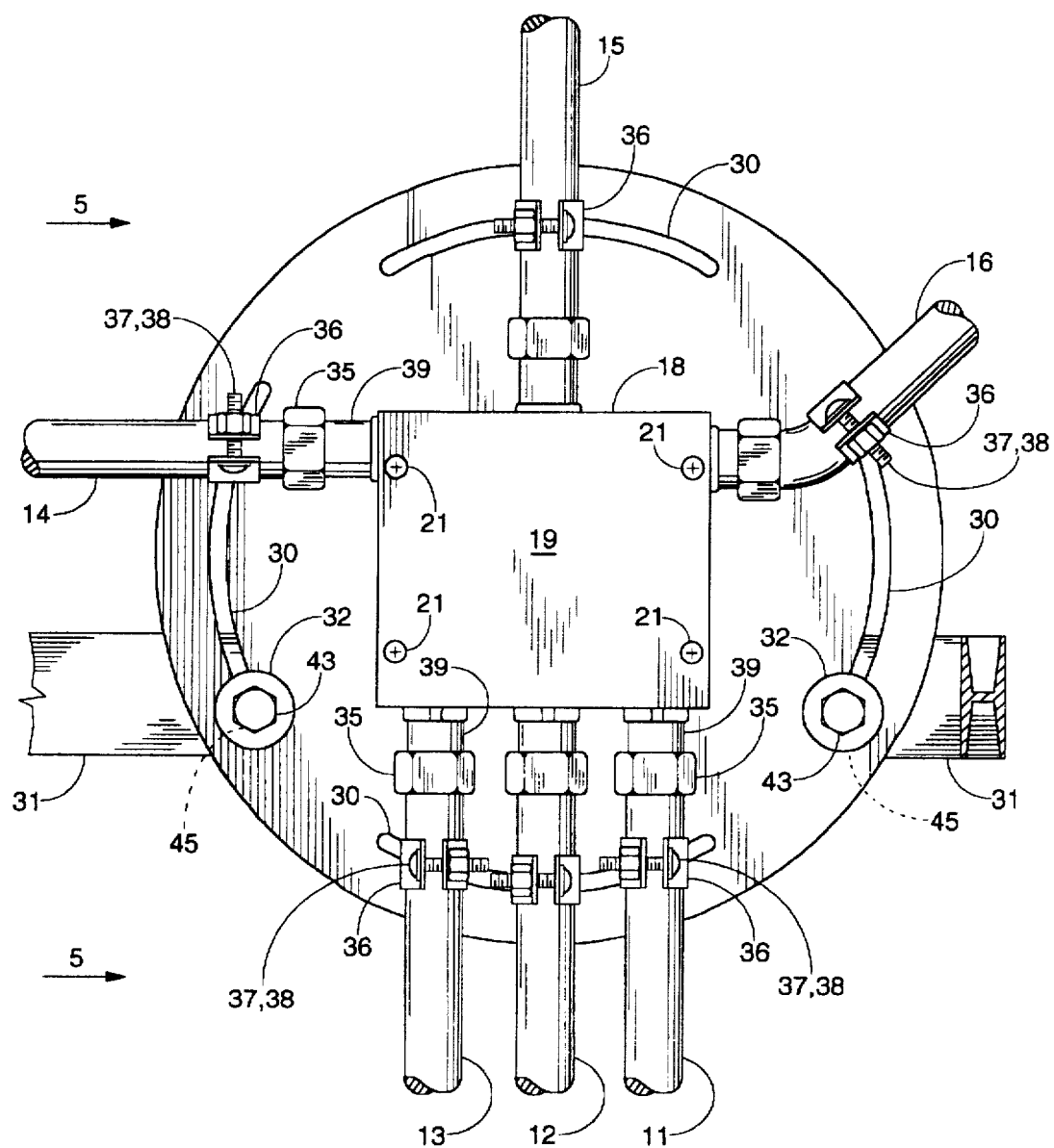
FIG. 2 shows a view from below of the embodiment of FIG. 1 in the same electrical installation.
Figure 3:
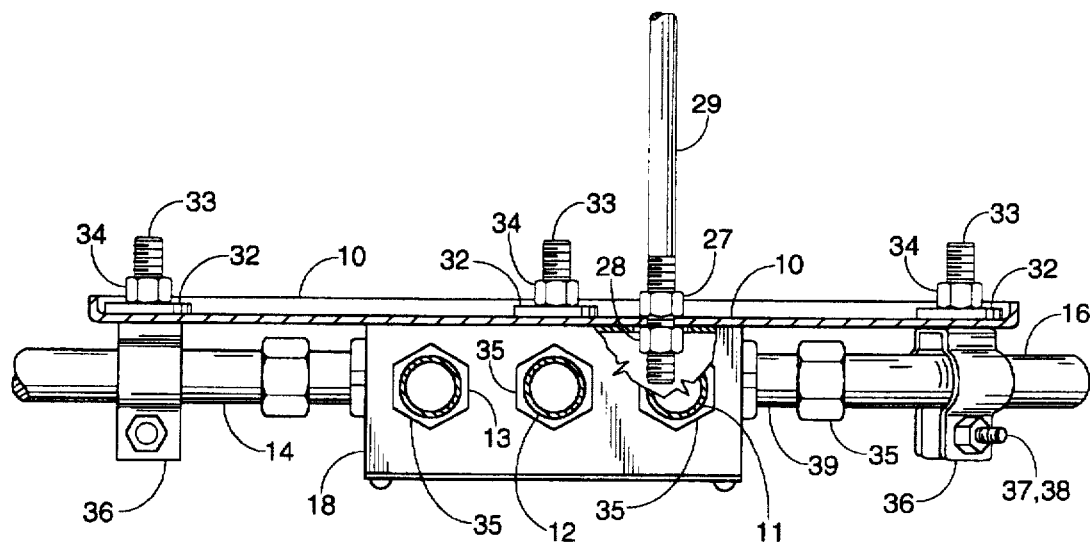
FIG. 3 shows a partial section view of the preferred embodiment taken along the line 3—3 of FIG. 1.

FIGS. 1, 2 & 3 are views of a preferred embodiment of junction box and conduit support bracket 10 of the present invention as used to mount electrical junction box 18 and support conduits 11–16 for entry. While junction box 18 is square in shape, it is to be understood that the present invention is applicable to octagonal junction boxes or those of any other available shape and that the following description is substantially the same regardless of junction box shape. FIG. 1 is a view of this installation from above. Support bracket 10 comprises a circular flat plate 20, which may be made of 22 gauge (0.0299" thick) galvanized sheet steel with flanged edge 22 for stiffness, or of thicker material without such stiffening means. Junction box 18 is assembled to the central portion of support bracket 10 by nut and bolt fasteners 25, which are fitted to two bolt holes 24' in the cruciform eight hole pattern 24. While a single fastener 25 can adequately mount junction box 18 on support bracket 10, second fastener 25 does not allow relative rotation 24 during conduit assembly. Six holes 24' of bolt hole pattern conform to dimensions of a hole pattern provided in junction box backs for mounting purposes, in accordance with industry standard practice, and two holes 24" are added for symmetry. Five additional holes 26' arranged in a 2" square pattern 26, with one in the center, are also provided in support bracket 10. In addition to the industry standard mounting holes, the flat back of junction box 18 also includes several knock-out entry ports 23, usually five, arranged in an approximately 2" square pattern, with one in the center. Hanger 29 is anchored at its unshown upper end and upper nut 27 is threaded on its lower end. The lower end of hanger 29 is passed through a convenient mounting hole in either pattern 24 or 26 of support bracket 10 after removing a knock-out 23 for access if using one of the holes 26'. Upper nut 27 and lower nut 28 mount support bracket 10 and junction box 18 at an elevation for entry of conduits 11–16. Flat plate 20 extends outwardly and the extended portion is pierced by arcuate slots 30, orthogonally arranged with respect to hole pattern 24 so as to be juxtaposed to the four sides of junction box 18. Fender washers 32, machine screws 33, nuts 34 and conduit clamps 36 connect conduits 11–16 to support bracket 10 as is further shown in FIGS. 2 and 3.

FIG. 2 shows an installation identical to that of FIG. 1 as seen from below, differing only in that the assembly is mounted to beam 31 by beam clamps 45, mounting bolts 43 and fender washers 32 rather than being suspended from an overhead structure by hanger 29. Here, junction box 18 is seen to have its cover plate 19 attached by fasteners 21 and the support of conduits 11–16 is more fully shown. Conduits 11–16 are seen to be installed for entry into junction box 18 by conduit entry fittings 39 and locked in place by tube nuts 35. Machine screws 33 are here seen to pass through arcuate slots 30 for mounting conduit clamps 36 to the underside of support bracket 10. Conduit clamps 36 are commercially available hardware items which are clamped to conduits 11–16 by machine screws 37 and nuts 38. A functional attribute of arcuate slot 30 is the offset displacement of machine screws 37, as shown for adjacent conduits 12 and 13, so as to obviate interference with each other in adjacent clamps 36.

FIG. 3 shows a side view and partial section view of the installation of FIGS. 1 & 2 as taken along the line 3—3 of FIG. 1, with an auxiliary, broken-out section detail of the mounting of support bracket 10. Here, upper nut 27 and lower nut 28 are seen to be tightened on hanger 29, so as to hold support bracket securely in place, and the removal of knock-out 23 for access to a hole 26' is also indicated.

The connection of clamps 36 by means of fender washers 32, machine screws 33 and nuts 34 to conduit support 10 and the clamping of conduit clamps 36 to conduits 14 and 16 by means of machine screws 37 and nuts 38 is more clearly shown in this view. Junction box 18 may be used in conjunction with ½", ¾" or 1" conduit sizes and there is a modest variation in the height of the clamping axis among these sizes. This variation may accommodated by slight flexure of support bracket 10 or by inserting additional washers 32 between support bracket 10 and either clamps 36 or junction box 18 as required. The relatively thin material of the preferred embodiment permits support bracket 10 to flex slightly so as to obviate the need for additional washers 32.

Figure 4:
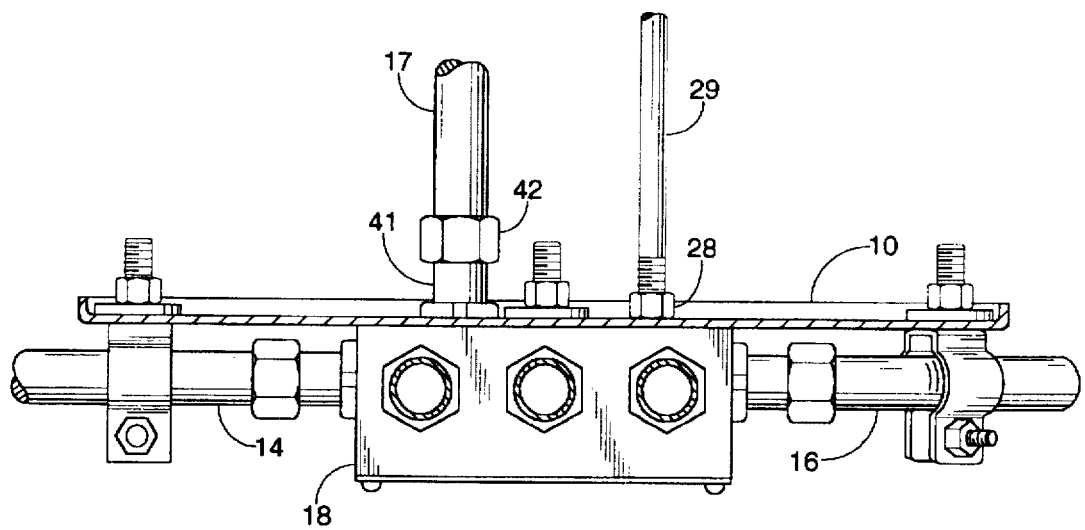
FIG. 4 shows the preferred embodiment of the present invention as used in a second electrical installation.

The electrical installation shown in FIG. 4 is essentially the same as that of FIGS. 1 and 3, except that a knock-out entry 23 has been opened in junction box 18 and a matching hole has been cut in conduit support 10 for installation of conduit 17, conduit entry fitting 41 and tube nut 42. Thus, support permits entry from above if such is required, and in fact, greatly simplifies access for such entry as compared to using formed "C" sections bolted to the back of junction box 18, as discussed previously.

Figure 5:
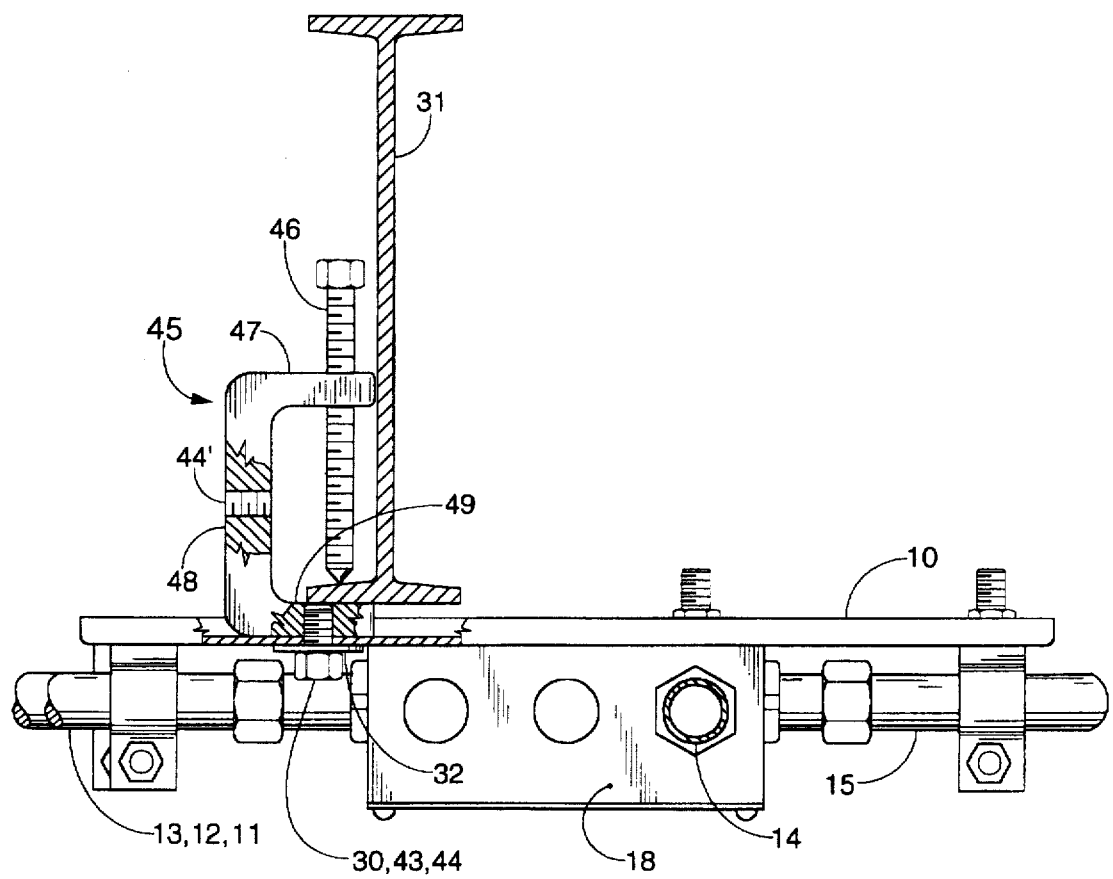
FIG. 5 shows the present invention as used to mount an electrical installation directly to a structural member.

FIG. 5 is an end view of the beam 31 of FIG. 2, as seen from the direction of arrows 5—5, showing the manner in which beam clamps 45 are attached. Beam clamps 45, which are commercially available items, comprise base, arm and jaw portions 47, 48 and 49 respectively, and have threaded holes 44 and 44' tapped in jaw portion 49 and arm portion 48 respectively. Support bracket 10 is secured to beam clamps 45, at selected slots 30, by mounting bolts 43 and fender washers 32. Beam clamps 45 are then positioned on beam 31 as shown, and tightened in place by clamping screws 46. If loading conditions permit, particularly as regards the size and number of entering conduits, a single beam clamp 45 and mounting bolt 43 may be used for a cantilevered mounting of support bracket 10. The provision of two threaded holes 44, at 90° to each other, allows great flexibility in the manner in which beam clamp 45 may be applied to different structural members for purposes of mounting support bracket 10 thereto.

Figure 6:
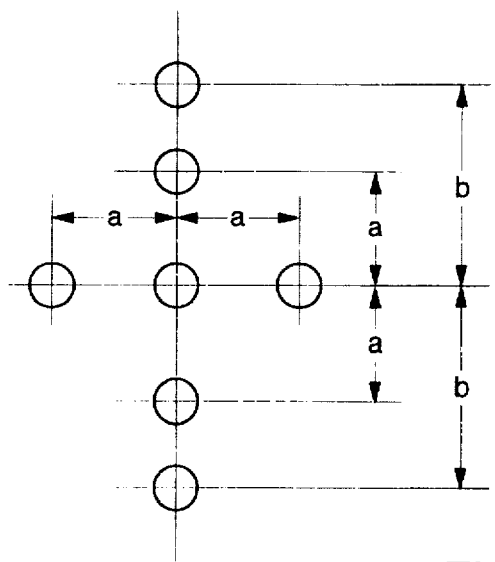
FIG. 6 shows an industry standard bolt hole pattern for junction boxes.

FIG. 6 shows the industry standard bolt hole pattern, which is centered in junction box backs for mounting purposes. In this standard practice hole pattern, dimension "a" is approximately 0.75" and dimension "b" is approximately 1.28".

Figure 7:
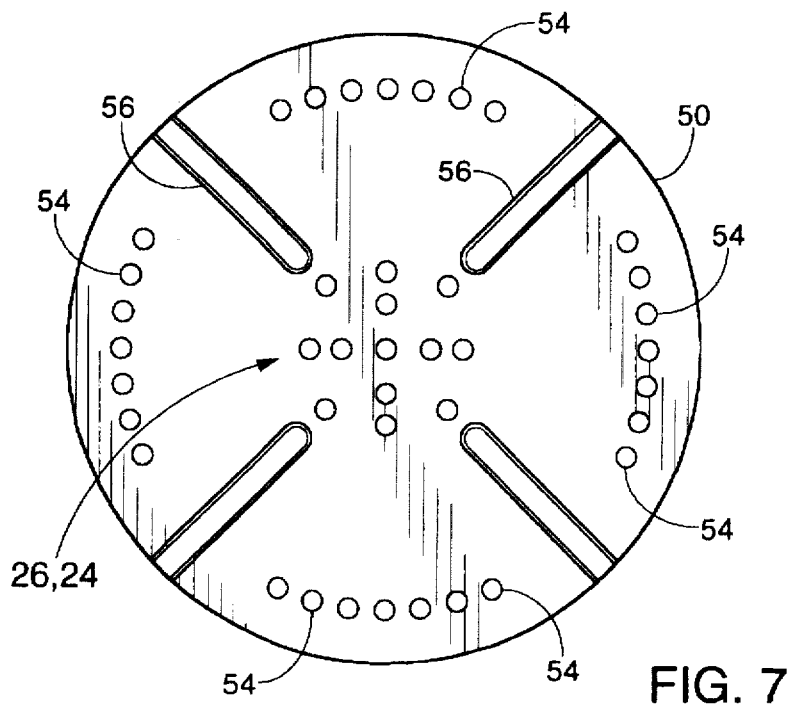
FIG. 7 shows an alternative embodiment of the present invention.
Figure 8:
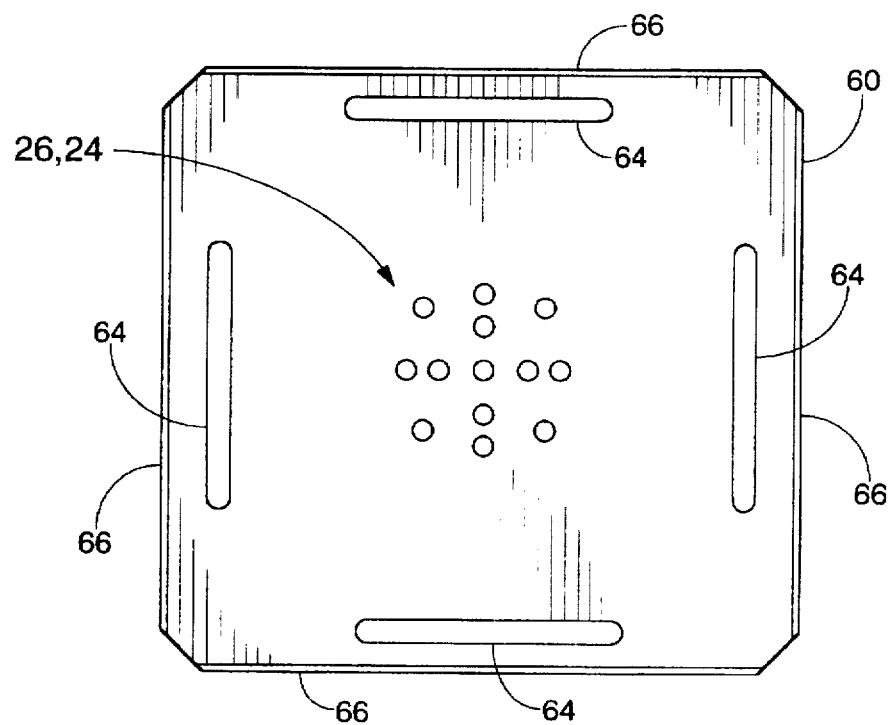
FIG. 8 shows a second alternative embodiment of the present invention.

FIGS. 7 and 8 show alternative embodiments of the present invention, support brackets 50 and 60 respectively. In FIG. 7, attachment for conduit clamps 36 to circular support bracket 50 is provided by a plurality of holes 54 arranged along an arcuate path so as to permit alignment with any chosen entry port. As in FIG. 1, hole patterns 24 and 26 are provided for assembly and mounting purposes. The stiffness required for conduit support is provided either by using material heavier than 22 ga. or by formed stiffening beads 56. In FIG. 8, support bracket 60 is made in a square cut shape with straight slots 64 for attaching conduit clamps 36. Stiffness for supporting conduits is provided by bent flanges 66 or by use of heavier material. It will be noted that in either case, a greater amount of material is required for an equivalent unit as compared to preferred support bracket 10 or alternative 50 and that clearance of bolts 37, as provided for adjacent clamps by an arcuate clamp arrangement, is also lost.

It is to be understood that the present invention is not limited to the disclosed embodiments and may be expressed by variation or substitution of constituents within the same spirit.

I claim:

1. A bracket for supporting an electrical junction box and conduit entering therein comprising:

an electrical junction box having sides with conduit entry ports and a back;

a flat plate having a central portion and extended portions;

means for supporting said flat plate;

means for attachment of the back of said box to said flat plate, in the central portion thereof, so that said flat plate extends beyond the sides of said box;

means for clamping conduit; and means for attachment of said conduit clamping means to said extended portions of said flat plate so as to place said clamping means in substantial alignment with the conduit entry ports in two of said sides of said box.

2. A bracket according to claim 1 wherein said box attachment means comprises a hole pattern conforming to a predetermined pattern of junction box mounting holes.

3. A bracket in accordance with claim 1 wherein said means for attachment of conduit clamping means further comprises an elongated slot.

4. A bracket in accordance with claim 1 wherein said means for attachment of conduit clamping means further comprises an arcuate, elongated slot.

5. A bracket in accordance with claim 1 wherein said conduit clamp attachment means further comprises a plurality of holes located in said extended portions so as to provide clamp attaching positions axially aligned with at least two said conduit entry ports.

6. A bracket in accordance with claim 1 wherein said flat plate further comprises stiffening means.

7. A bracket in accordance with claim 6 wherein said stiffening means further comprises a flanged edge around said extended portions of said flat plate.

8. A bracket in accordance with claim 6 wherein said stiffening means further comprises a thickness of said plate in excess of 0.0299 inches.

9. A bracket in accordance with claim 6 wherein said stiffening means further comprises a formed stiffening bead.

10. A bracket in accordance with claim 6 wherein said means for attachment of said flat plate to a junction box further comprises a centrally located hole pattern in said flat plate matching a predetermined hole pattern in said box.

11. A bracket for supporting an electrical junction box and conduit entering therein comprising:
- an electrical junction box including a flat back surface with mounting holes and opposed sides with conduit entry ports;
- a flat plate including outwardly extending portions and a centrally located hole pattern for cooperating with the mounting holes in said box;
- means for attachment of said flat plate on said flat back surface, so that said flat plate extends beyond said box at said opposed sides;
- means for clamping conduit; and
- means for attachment of said conduit clamping means to one of said outwardly extending portions of said flat plate so as to place a clamping axis of said clamping means in substantial alignment with a selected one of said conduit entry ports of said box.

12. A bracket in accordance with claim 11 wherein said conduit clamping means attachment means further comprises a plurality of elongated slots in said flat plate, located in said outwardly extending portions, so as to provide clamping means attaching positions axially aligned with said entry ports on at least two of said sides of said box.

13. A bracket in accordance with claim 11 wherein said conduit clamping means attachment means further comprises a plurality of arcuate, elongated slots in said flat plate, located in said outwardly extending portions, so as to provide clamping means attaching positions axially aligned with said entry ports on at least two of said sides of said box.

14. A bracket in accordance with claim 11 wherein said conduit clamping means attachment means further comprises an elongated slot in said flat plate, located in said outwardly extending portions, so as to provide clamping means attaching positions axially aligned with a plurality of said entry ports to said box.

15. A bracket in accordance with claim 11 wherein said conduit clamping means attachment means further comprises an arcuate, elongated slot in said flat plate, located in said outwardly extending portions, so as to provide clamping means attaching positions axially aligned with a plurality of said entry ports to said box.

16. A bracket in accordance with claim 11 wherein said conduit clamping means attachment means further comprises a plurality of holes in said flat plate, located in said outwardly extending portions, so as to provide clamping means attaching positions axially aligned with a plurality of said entry ports to said box.

17. A method for supporting an electrical junction box and conduit entering therein comprising the steps of:
- providing an electrical junction box including a back with mounting holes and sides with conduit entry ports;
- providing a flat plate for supporting the junction box, said flat plate including a central portion and outwardly extending portions;
- attaching the junction box centrally on said flat plate so that the outwardly extending flat plate portions extend beyond the sides of the box;
- providing conduit clamping attachments;
- attaching said conduit clamping attachments to the outwardly extending portions of said flat plate so as to support conduits for entry into said ports in the sides of said box; and
- mounting the flat plate so as to support the junction box and the conduits.

* * * * *